(12) United States Patent
Fliss et al.

(10) Patent No.: US 6,411,451 B1
(45) Date of Patent: Jun. 25, 2002

(54) LASER PROTECTION SYSTEM

(75) Inventors: Gerald Fliss, Ventura; Robert E. Lee, Oxnard, both of CA (US); George P. Mueller, Washington, DC (US); Tim D. Andreadis, Silver Spring, MD (US); Paul Wyman, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 07/503,555

(22) Filed: Mar. 28, 1990

(51) Int. Cl.$^7$ .................................................. G01J 1/20
(52) U.S. Cl. ....................... 359/890; 359/888; 359/614; 89/1.1
(58) Field of Search ................................. 350/313, 314, 350/316; 340/705; 359/888, 890, 614; 42/120; 89/1.1

(56) References Cited

U.S. PATENT DOCUMENTS

| | | |
|---|---|---|
| 3,267,807 A | 8/1966 | Swope et al. .................. 88/112 |
| 3,269,267 A | 8/1966 | Collins ........................ 88/112 |
| 3,519,339 A | 7/1970 | Hutchinson et al. .......... 351/44 |
| 3,620,597 A | 11/1971 | Schwartz et al. ............ 350/160 |
| 3,792,914 A * | 2/1974 | Sarna .......................... 350/163 |
| 4,143,265 A * | 3/1979 | Krappatsch ............. 250/213 R |
| 4,151,411 A * | 4/1979 | Derderian et al. .......... 250/225 |
| 4,462,661 A | 7/1984 | Witt ........................ 350/331 R |
| 4,703,522 A | 11/1987 | Schurle et al. .................. 2/432 |
| 4,802,719 A | 2/1989 | Margarinos et al. ........ 350/365 |
| 4,855,930 A * | 8/1989 | Chao et al. .................. 364/497 |

* cited by examiner

*Primary Examiner*—Nelson Moskowitz
(74) *Attorney, Agent, or Firm*—David Kalmbaugh

(57) ABSTRACT

The present invention pretains to a device for protecting the human eye by means of a narrow bandwith interference filter which filters out one or more specific wavelengths of light emitted in the form of a coherent, concentrated beam that is laser radiation and in coherent light, an image intensifier for amplifying an image passing through the narrow bandwidth filter to an observable light level, and a neutral density filter which reduces image reflected illuminance to avoid detection.

3 Claims, 2 Drawing Sheets

LASER PROTECTION SYSTEM

BACKGROUND OF THE INVENTION

1. Field of the Invention

The invention relates generally to eye protection. In particular, this invention relates to an optical filtering apparatus for protecting the eye against radiation from a laser.

2. Description of the Prior Art

The increasing use of leaser light beams in military and other applications has underscored the need for protective systems and, particularly eye wear for protecting individuals from retinal damage. One method for dealing with this is the individual. However, due to the fact that such goggles or safety glasses filter out a wide range of wavelengths, the outside world tends to undergo drastic coloration when viewed through such a shield. Further, if protection from a number of wavelengths is desired, the use of a multilayer conventional color filter reduces the quality of the system form marginal to unacceptable.

Additionally, while such laser safety eyeglasses or goggles do protect the eye of the user from radiation which essentially comes head on and enters through the protective filters, these safety eyeglasses due leave regions open between the upper edge of the mounting frame and the eyebrows of the user and between the lateral edges of the mounting frame and the temple. When working with a laser beam apparatus, it is quite possible that when the user of such safety eyeglasses drops or rotates the head, laser radiation can gain access to the eye of the user through these unprotected regions causing damage thereto.

An alternative to such conventional color filters is the holographic notch filter. Such notch filters, generally, have the desirable characteristic that upon being exposed with light of a given wavelength, in the proper holographic configuration, a very narrow bandwidth effectively reflective surface (which is optically a diffractive surface) will be formed holographically. This reflective surface or "notch filter" comprises recorded interference patterns in a photo-sensitive material such as dichromated gelatin. Such a holographically exposed gelatin layer will exhibit reflective properties along a very narrow range of wavelengths substantially identical to the recording wavelengths.

However, a serious limitation of such systems is the fact that dichromated gelatin is not sensitive to the various laser hazard wavelengths against which one desires to protect.

With the-disadvantages inherent in the design of prior art laser protective goggles or safety glasses the present invention was conceived and one of its objects is to provide a laser radiation protection device for the human eye which will not interfere with the forward or peripheral vision of the user.

It is yet another object of the present invention to provide a laser eye protection device which is responsive to a broad range of laser frequencies.

It is a further object of the present invention to provide a laser eye protection device which is relatively simple in design, convenient to wear and which will not interfere with the normal activities of the wearer.

These and other objects of the present invention will become apparent from the following detailed description of the preferred embodiment.

SUMMARY OF THE INVENTION

The present invention is a device for protecting the human eye by means of a narrow bandwidth interference filter which filters out one or more specific wavelengths of light emitted in the form of a coherent, concentrated beam that is laser radiation, an image intensifier for amplifying an image passing through the narrow bandwidth filter to an observable light level, and a neutral density filter which reduces image reflected illuminance to avoid detection.

DESCRIPTION OF THE PREFERRED EMBODIMENT

Figure 1:
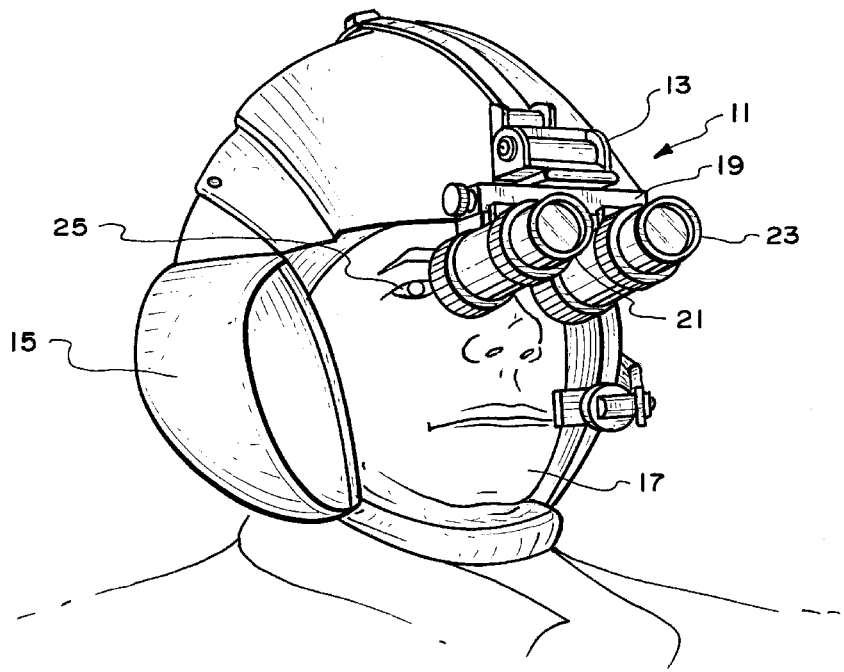
FIG. 1 is a perspective view of an observer utilizing the laser protection system constituting the present invention.

Referring first to FIG. 1, there is shown a helmet mounted night vision goggle system 11 comprising an optical support structure 13 adapted to be mounted on a helmet 15, which is worn by an observer 17. Optical support structure 13 includes a rotatable support bar 19 which has attached thereto a pair of image intensifier tubes 21 and 23 in optical alignment with the eyes 25 of observer 17. Each image intensifier tube has mounted therein the optical components of a laser protection system 27, FIG. 2, constituting the present invention.

At this time it should be noted that the night vision goggle system 11 selected for use with laser protection system 27 is a Litton, Model M-927, Aviator's Night Vision System which has a pair of second generation 18 mm microchannel plate image intensifiers for image enhancement.

In addition, it should be noted that the second generation image intensifier may be replaced with a third generation image intensifier to upgrade system 11 to a model M-929 Aviator's Night Vision System. It is also pointed out, however, that any like quality image intensifier can be equally well employed in the goggle system 11, provided the image intensifier is optically modified as described herein. In fact, any third or successive generation of image intensifier likewise may be employed.

Figure 2:
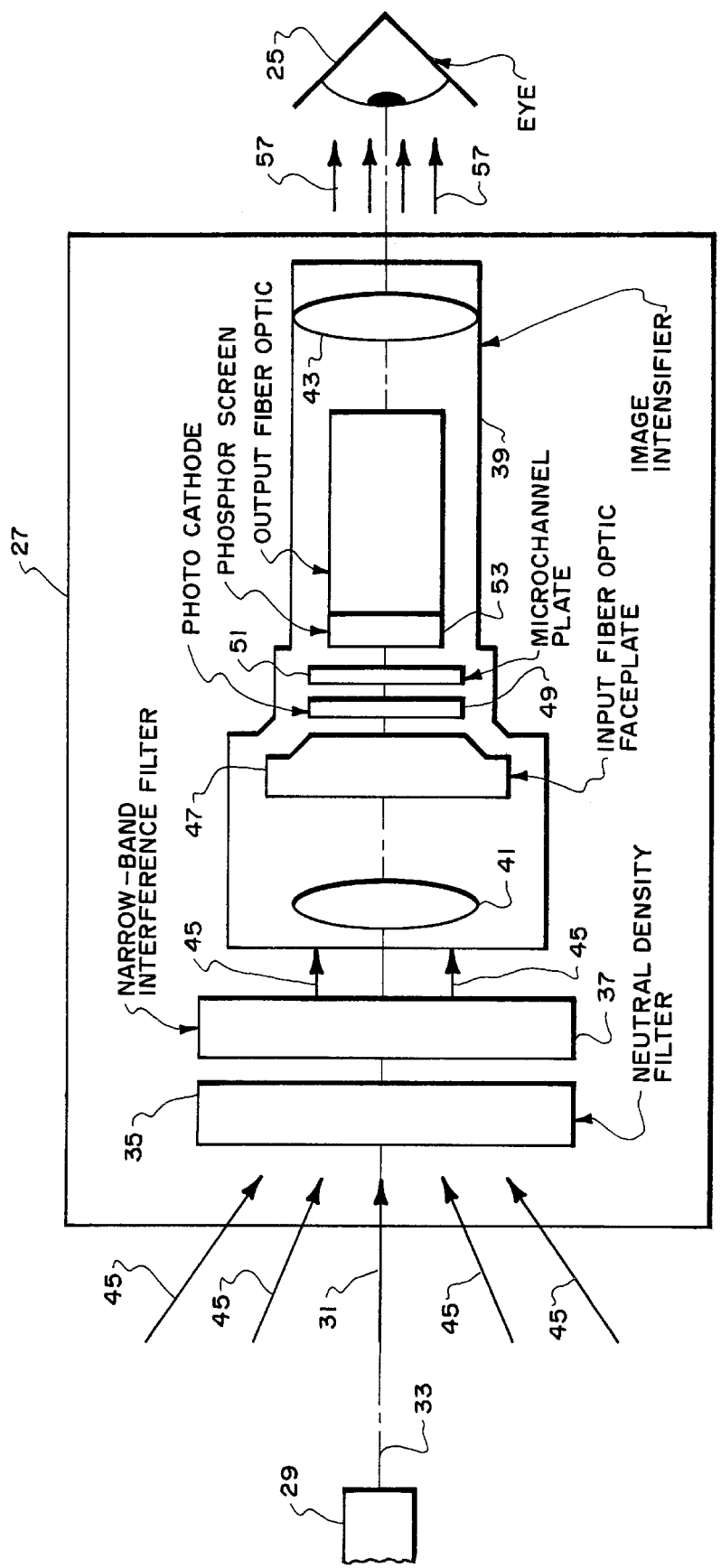
FIG. 2 is a schematic representation of the laser protection system constituting the present invention.

Referring now to FIG. 2 there is shown a laser 29 which emits an intense collimated beam of radiant energy 31 of a particular energy level and wavelength along an optical or light path 33. It should be noted that laser 29 may be an argon laser, a helium neon laser, a ruby laser or any like apparatus for generating a very narrow, intense beam of coherent light. Spatially disposed downstream from laser 29 along optical path 33 is the laser protection system 27 constituting the present invention. Laser protection system 27 comprises a neutral density filter 35, a narrow-band interference filter 37 spatially disposed downstream from neutral density filter 35 along optical path 33, and an image intensifier 39 spatially disposed downstream from narrow-band interference filter 37 along optical path 33. Positioned downstream from filter 37 along optical path 33 is a first lens 41 while there is positioned in front of eye 25 along optical path 33 a second lens 43, with lenses 41 and 43 being components of image intensifier 39.

Figure 3:
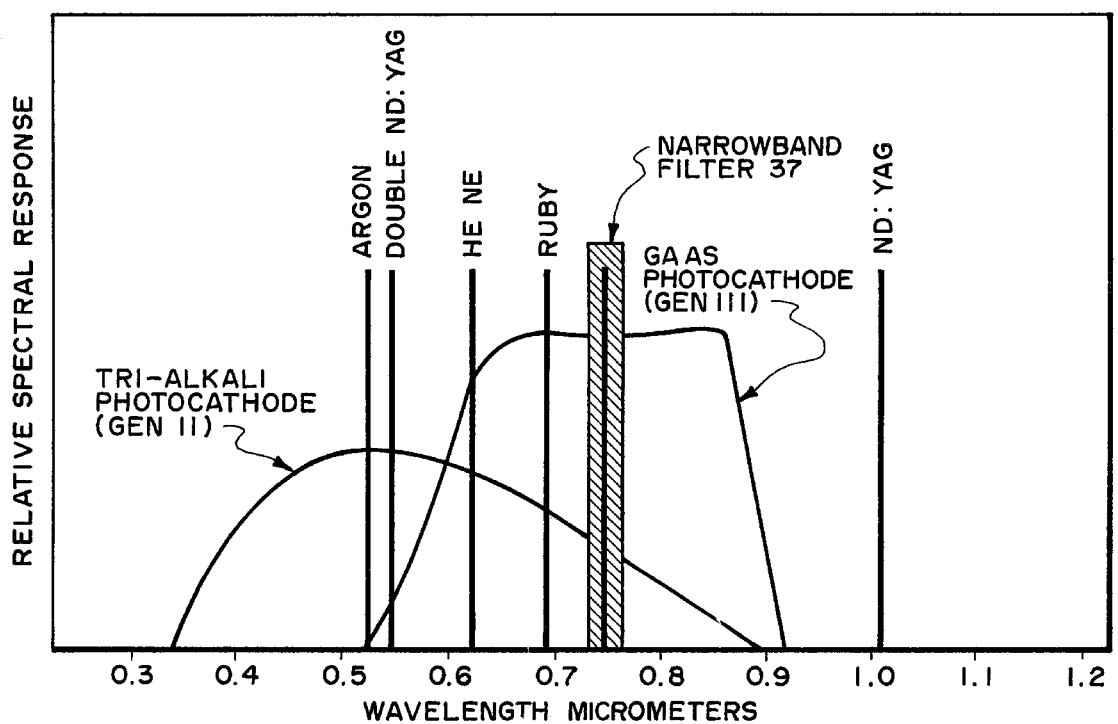
FIG. 3 is a graph illustrating the operating frequency of various lasers with respect to the laser protection system of the present invention.

Referring now to FIGS. 2 and 3 neutral density filter 35, which may be fabricated from inconel-coated glass or fused silica, absorbs part of the incident radiation from laser 29 as well as part of the incident visual/visible image forming light 45 from an image, not shown, viewed by observer 17.

This partial absorption of incident laser radiation and visual light by neutral density filter 35 reduces reflected illuminance to a point where reflected light from laser protection system 27 is not visible to the human eye which, in turn, allows observer 17 to avoid detection.

Narrow-band interference filter 37 will reflect all out-of-band laser radiation, generally indicated by arrow 31, which passes through neutral density filter 35. Visible imaging forming light, generally indicated by arrows 45, which passes through neutral density filter 35 and which is within the passband wavelength of narrow-band interference filter 37 will pass through filter 37 to lens 41.

The preferred narrow-band interference filter 37 used in laser protection system 27 is a dielectric interference filter manufactured by Melles Griot having a passband 32 angstroms wide which is centered at 750 nanometers. As is best illustrated in FIG. 3, a filter having the reflection characteristics of filter 37 will reflect laser radiation from an argon laser operating at approximately 520 nanometers, a helium neon laser operating at approximately 620 nanometers, and a ruby laser operating at approximately 695 nanometers. Filter 37 will also reflect laser radiation from a neodymium yttrium aluminum garnet (YAG) laser operating at approximately 1064 nanometers, a double neodymium YAG laser operating at approximately 532 nanometers, and all other like radiation having wavelengths outside of the passband of filter 37.

Lens 41 inverts and focuses the image forming light 45 passing through filter 37 on to an input fiber optic faceplate 47. Faceplate 47 then directs the image forming light 45 to a photocathode 49 which converts the photons from the light 45 to electrons in proportion to the amount of light falling thereon. It should be noted that photocathode 45 may be a tri-alkali photocathode which is typically used in a second generation image intensifier or a gallium arsenide photocathode which is typically used in a third generation image intensifier. The third generation image intensifier, in turn, typically provides an enhanced spectral response over the second generation image intensifier.

The electrons emitted by photocathode 49 are directed to a microchannel plate 51 which generally consist of microscopic hollow glass conduction capillaries or channels fused into a thin disc-shaped array less than one millimeter thick, and having approximately two million channels. The glass conduction channels of microchannel plate 51 are connected in parallel to a direct current voltage potential of approximately 3000 volts and each channel well emits secondary electrons when electrons emitted by photocathode 49 collide with the channel walls. Repeated collision of the secondary electrons with the channel walls of microchannel plate 51 initiates a cascade of secondary electrons that continuously multiplies as the electrons progress through the channels. The electron gain of microchannel plate 51 produced by this process is controlled by varying voltage across the plate and is achieved in a small volume without image deterioration.

The secondary electrons emitted by microchannel plate 51 are directed to a phosphor screen 53 which converts the electrons to an enhanced optical image which is then re-inverted by and passes through an output fiber optic bundle 55 to lens 43 which functions as an eyepiece so as to allow the enhanced visual image, provided by image intensifier 39 and designated generally by arrows 57 to be viewed by the eye 25 of observer 17.

As is best illustrated in FIG. 3 a second-generation tri-alkali photocathode is responsive from approximately 400 nanometers to 870 nanometers, while a third generation gallium arsenide photocathode is responsive from approximately 570 nanometers to 920 nanometers. Thus, any filter which is centered between approximately 570 nanometers and 870 nanometers and has a bandpass of approximately 30 angstroms or less may be used with laser protection system 27 as long as the filter selected is not centered at the operating wavelength of a helium neon, a ruby or any other like laser not illustrated in FIG. 3.

It should be noted that use of a third generation image intensifier with laser protection system 27 as opposed to a second generation image intensifier will provide an enhanced visual image to the eyes 25 of observer 17 as is best illustrated in FIG. 3.

Tables 1 and 2 below show the results of tests on laser. protection system 27. These tables give the center wavelength of narrow-band interference filer 37, the filter line width of filter 37, the illuminance from a target/visual image, and the optical density (OD) for a minimum detectable scene. Table 1 illustrates data where the center wavelength is varied and the line width is held constant, while table 2 illustrates data where the line width is varied and the center wavelength is held constant. Table I. Variable wavelengths, constant line widths.

TABLE I

Variable wavelengths, constant line widths.

| CENTER WAVE-LENGTH (nm) | LINE WIDTH (nm) | ILLUMI-NANCE FROM TARGET KILO FOOT CANDLE | TOTAL OPTICAL ATTENUATION FOR MIN DET SCENE | TOTAL OPTICAL ATTENUATION FOR MIN DET SCENE NORMALIZED TO 1-kfc |
|---|---|---|---|---|
| 900 | 10 | 1.5 kfc | 5.9 OD | 5.7 OD |
| 800 | 10 | 1.5 kfc | 6.5 OD | 6.3 OD |
| 750 | 10 | 1.5 kfc | 6.8 OD | 6.6 OD |
| 700 | 10 | 1.1 kfc | 6.6 OD | 6.5 OD |
| 660 | 10 | 1.5 kfc | 7.0 OD | 6.8 OD |
| 620 | 10 | 1.2 kfc | 6.8 OD | 6.7 OD |
| 600 | 10 | 1.2 kfc | 6.8 OD | 6.7 OD |

TABLE II

Variable line widths, constant wavelengths.

| CENTER WAVE-LENGTH (nm) | LINE WIDTH (nm) | ILLUMI-NANCE FROM TARGET KILO FOOT CANDLE | TOTAL OPTICAL ATTENUATION FOR MIN DET SCENE | TOTAL OPTICAL ATTENUATION FOR MIN DET SCENE NORMALIZED TO 1-kfc |
|---|---|---|---|---|
| 755 | 1 | 1.5 kfc | 5.0 OD | 4.9 OD |
| 755 | 6.2 | 1.1 kfc | 6.1 OD | 6.1 OD |
| 755 | 10 | 1.1 kfc | 6.1 OD | 6.1 OD |
| 755 | 20 | 1.1 kfc | 6.7 OD | 6.7 OD |
| 755 | 40 | 1.1 kfc | 7.0 OD | 7.0 OD |

Obviously many modifications and variations of the present invention are possible in the light of the above teachings. It is therefore, to be understood that within the scope of the appended claims the invention may be practiced otherwise than as specifically described.

What is claimed is:

1. An optical system for protecting the eye of an observer against a beam of laser radiation of selected wavelength projected along a light path by a source of radiant energy, said optical device comprising:

first filtering means positioned on said light path facing said source for partially absorbing laser radiation from said source and incident visible light so as to reduce reflected illuminance from said optical system thereby allowing said observer to avoid detection;

second filtering means positioned downstream from said first filtering means on said light path for passing only visible light within a selected passband and reflecting therefrom laser radiation from said source thereby protecting the eye of said observer; and image intensifier means positioned downstream from said second filtering means on said light path for amplifying visible light passing through said second filtering means so as to form a visual image which may be viewed by said observer;

said image intensifier means comprising a photocathode positioned on said light path facing said second filtering means, a phosphor screen positioned on said light path facing said eye and a microchannel plate positioned on said light path between said photocathode and said phosphor screen.

2. The optical system of claim 1 wherein said second filtering means comprises a narrow-band interference filter having a passband of approximately 32 angstroms centered about a wavelength of 750 nanometers.

3. An optical device for protecting an eye against a beam-of laser energy of selected wavelength projected along a light path by a source of radiant energy, said optical device comprising:

a neutral density filter positioned on said light path facing said source of radiant energy;

an image intensifier positioned on said light path facing said eye, said image intensifier having a photocathode positioned on said light path facing said neutral density filter, a phosphor screen positioned on said light path facing said eye and a microchannel plate positioned on said light path between said photocathode and said phosphor screen; and a narrow-band interference filter positioned on said light path between said neutral density filter and said image intensifier, said narrow-band interference filter having a narrow passband approximately 32 angstroms wide and centered about a wavelength of 750 nanometers.

* * * * *